April 23, 1957 D. L. KEISER 2,789,519
LOCOMOTIVE TRUCK
Filed Oct. 2, 1952 4 Sheets-Sheet 1

INVENTOR
David L. Keiser

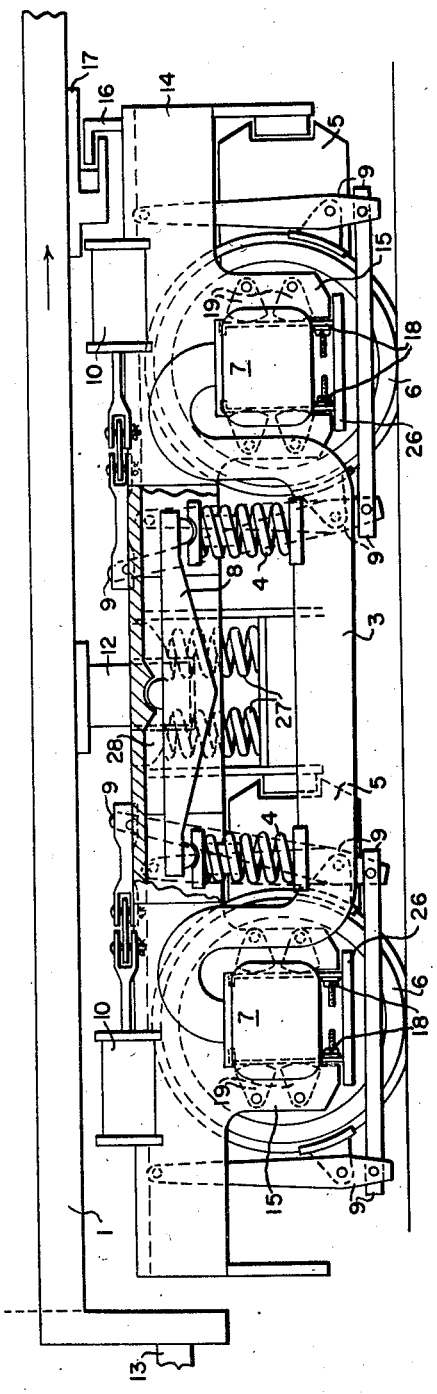

April 23, 1957  D. L. KEISER  2,789,519
LOCOMOTIVE TRUCK
Filed Oct. 2, 1952  4 Sheets-Sheet 3

INVENTOR
David L. Keiser

United States Patent Office 2,789,519
Patented Apr. 23, 1957

2,789,519

LOCOMOTIVE TRUCK

David L. Keiser, San Antonio, Tex.

Application October 2, 1952, Serial No. 312,776

3 Claims. (Cl. 105—49)

This application is a continuation-in-part of co-pending application Serial No. 66,931, filed December 23, 1948, which has now matured into Patent No. 2,678,007.

This invention relates to an improvement in a diesel electric locomotive having a cab or superstructure with a draw bar fixed at each of its two ends, and being supported by two swivel acting trucks having two wheeled axles, each being equipped with a standard axle hung traction motor, and the truck frames having attached thereto the universal air brake equipment, the cab being of any length or construction. The objects of this invention are (1) to reduce to a minimum the amount of weight transferred from one axle to any other axle caused by the tractive effort and draw bar pull and thereby improve the efficiency of the locomotive, (2) to reduce the weight transferred from one axle to any other axle caused by the brake application and (3) to reduce to a minimum the friction, or adhesion, between the journal boxes and the pedestals thereby preventing still further the weight reduction of the axles referred to above, and at the same time to improve the action of the supporting springs when operating over uneven trackage, all of which is accomplished by novel arrangements, combinations, improvements and added parts.

The accompanying drawings, referred to herein and constituting a part hereof, illustrate an embodiment of the invention, and together with a detailed description serve to explain the principles of the invention.

Figure 1A:
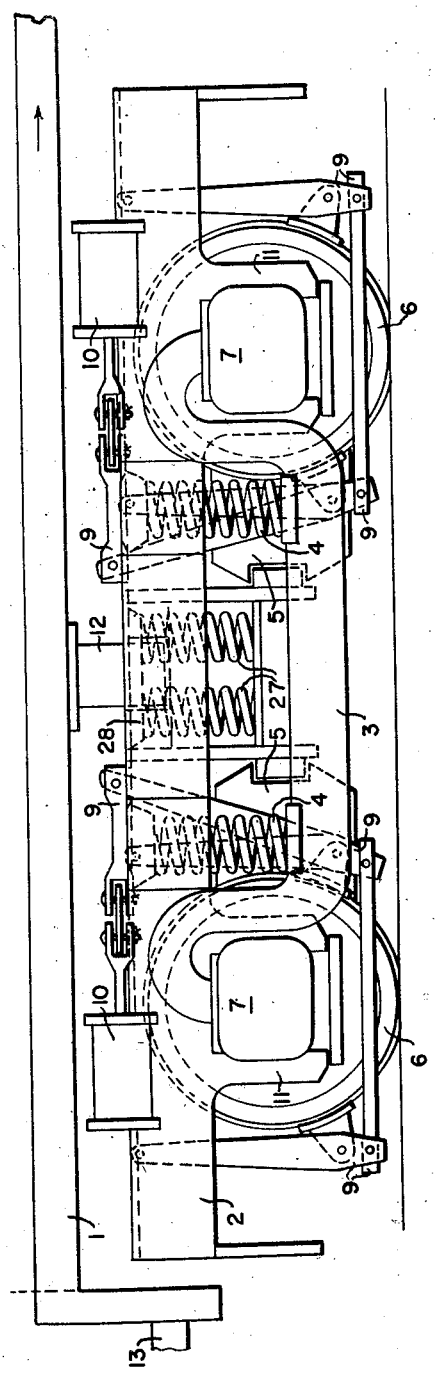
Figure 1B:
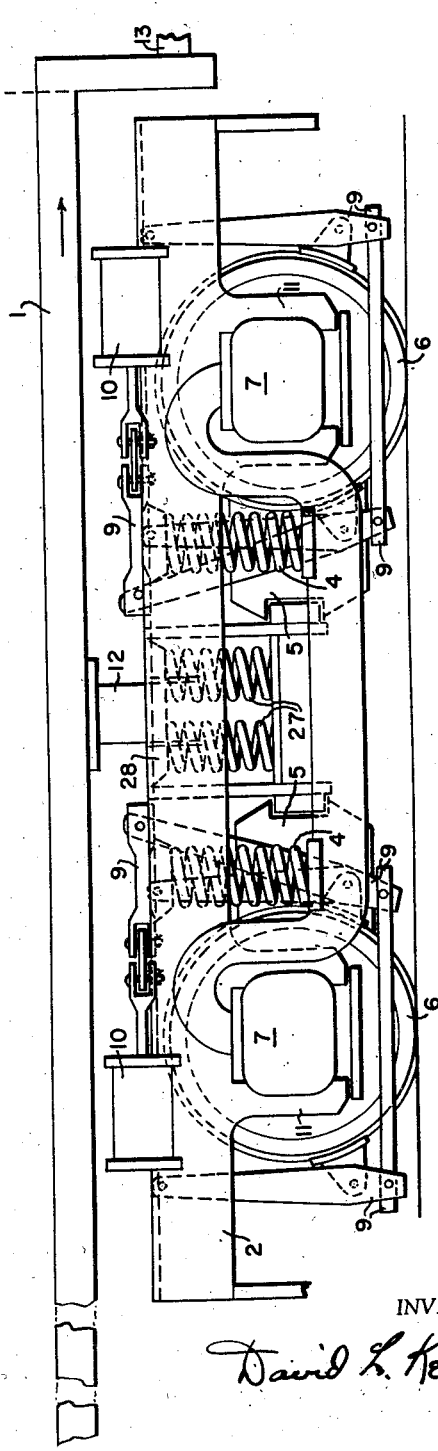

In the drawings: Figures 1A and 1B are side views in elevation of the rear and front trucks of the unimproved, conventional locomotive with the cab shown broken away between the trucks for convenience of illustration. Figures 2A and 2B are side views in elevation of the rear and front trucks of the improved locomotive, showing the new and added equalizer, the arcuate journal connecting the truck ends and the cab frames, the motor rearrangement and the pedestal improvement.

Figure 3:
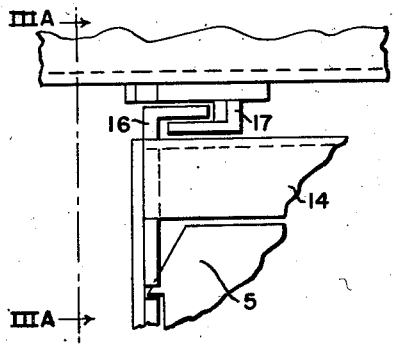
Figure 3A:
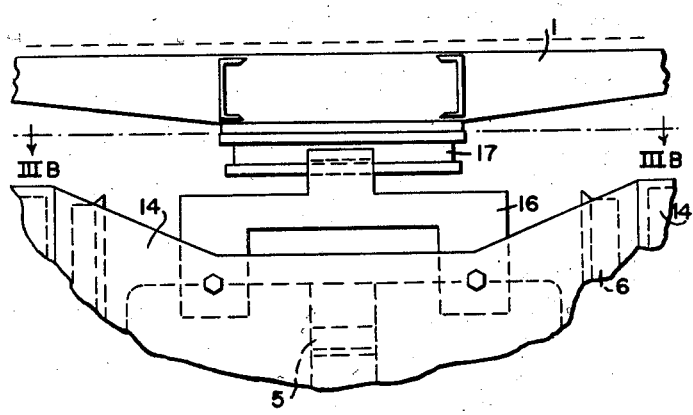
Figure 3B:
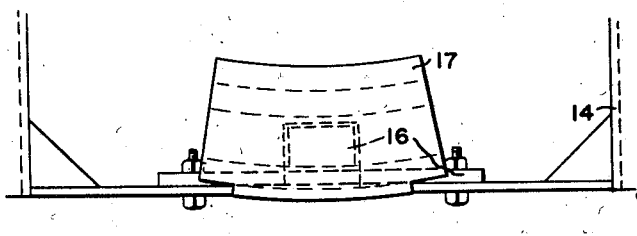

Figure 3 is an enlarged end view of the rear end of the truck shown in Figure 2B showing the arcuate journal. Figure 3A is an enlarged end view taken on line IIIA—IIIA of Figure 3. Figure 3B is a plan view and taken on line IIIB of Figure 3A.

Figure 4:
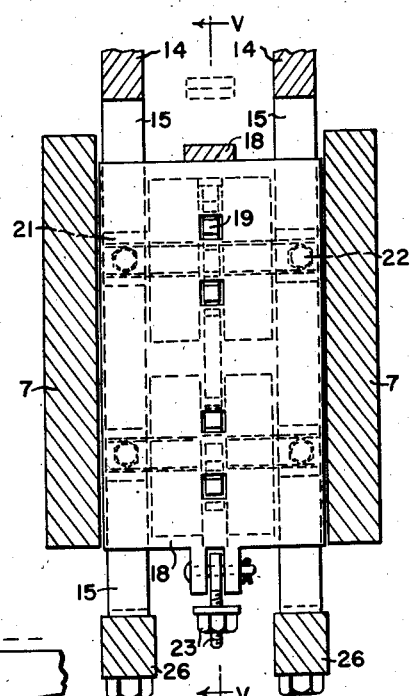
Figure 5:
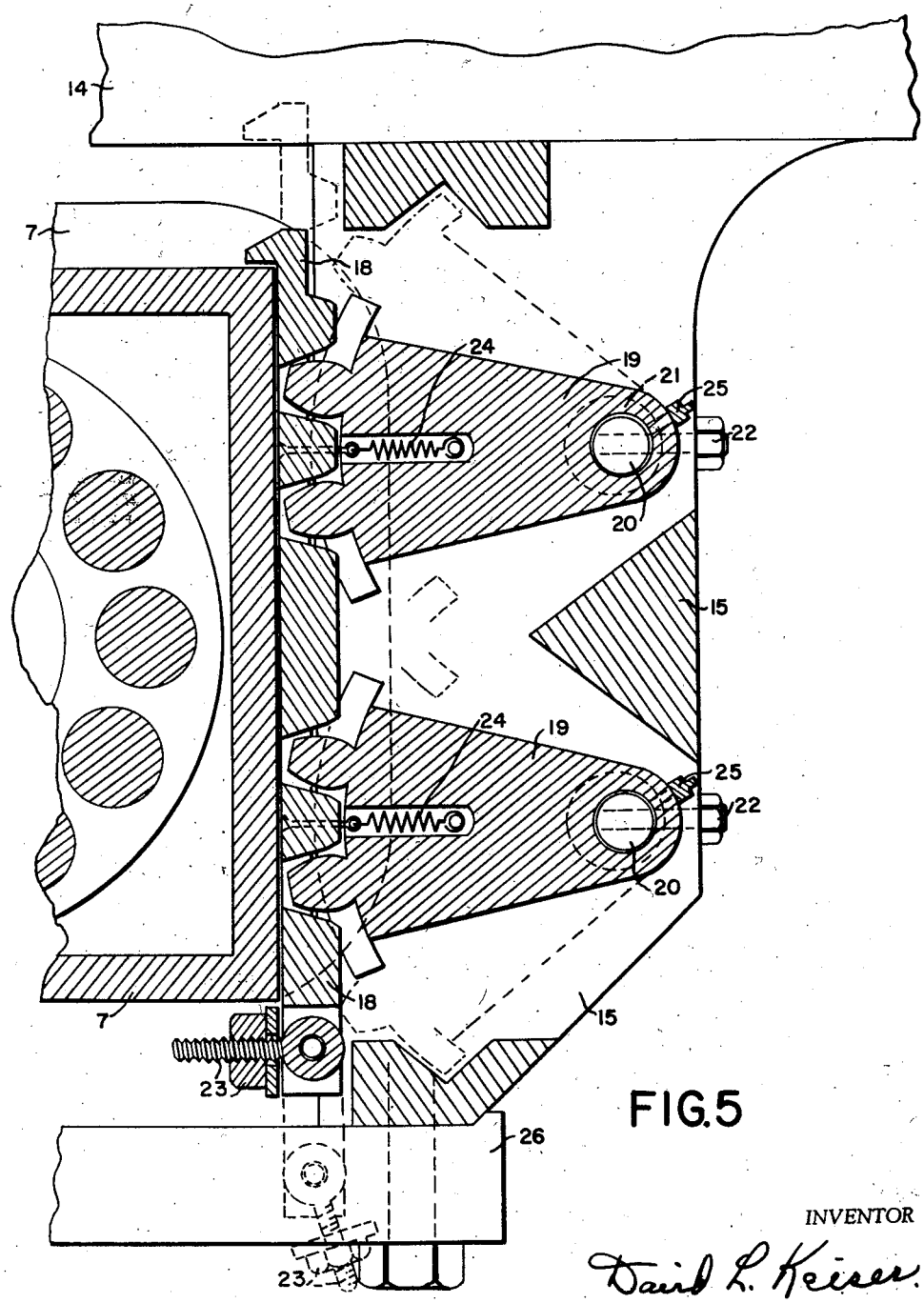

Figure 4 is a cross sectional elevation and taken on line IV—IV of Figure 2B. Figure 5 is an enlarged fragmentary section taken on line V—V of Figure 4. Referring now to Figure IA and IB of the unimproved locomotive, the cab not being shown, only the under frame which is shown broken away between the trucks for convenience of illustration, and extends the entire length of the locomotive and is designated by numeral 1. At each end of the cab frame there is connected a draw bar 13, and at a point near each end there is provided and attached thereto a king pin 12. The two unimproved truck frames 2 with the unimproved pedestals 11 are equipped with wheeled axles 6 the ends of said axles being equipped with journal boxes 7 arranged to slide vertically between the two members of the pedestals 11. Resting upon the journal boxes are two distributing bars 3 placed on the outside of the two side walls of the truck frame, and resting upon the extreme ends of the journal boxes. In some cases only one of these distributing bars is used per side frame and rests upon the center of the journal boxes.

Resting upon these distributing bars, near the ends, are two supporting springs 4 which extend up and in between the two side walls of the truck side frame and are arranged to support the truck frame top piece. The springs shown as 27 are resting upon the truck frame, in between the two side frames, supporting the bolster 28 which is positioned in between the two cross members of the truck frame.

The springs may consist of some six to ten supporting the ends of the bolster, and may be of either the elliptical or helical type, the bolster 28 being positioned in between two cross members of the truck frame and arranged for vertical travel, and with the king pin seated in a socket in the bolster the truck is arranged for swivel action.

The air brake equipment consisting of brake shoes, levers, links, connecting rods and such are designated by numeral 9, and the brake cylinder 10. The traction motors placed in between the axles are designated by numeral 5.

Referring now to Figures 2A and 2B illustrating the improvements claimed in this invention, the cab frame is designated by numeral 1, the king pin attached to the cab frame by numeral 12, the improved truck frame 14, the truck frame improved pedestal 15, the draw bar 13, distributing bar 3, and the main supporting springs 4.

The new and added equalizer 8 resting upon the springs and pivotally connected to the truck frame distributes the load equally between the supporting springs. The traction motors are designated by numeral 5 and are shown in their correct position for justifying the claims set forth in this invention. The new and added arcuate journal 16 attached to either end of the truck, preferably to the end toward the center of the locomotive, and running in the channel of the bolster 17, is fixed to the underside of the bed frame 1, maintaining horizontal relation between the truck and cab frames, which is made possible by the addition of the equalizer 8. The improved pedestal 15 is shown containing the new pressure blocks 19 and pressure plates 18 and a part of the journal box 7. The truck bolster 28 and the supporting springs 27 are the same as those in the unimproved truck.

The air brakes, consisting of shoes, hangers, levers, links and such are unchanged and designated by numeral 9 and the air brake cylinder by 10. The journal box and pedestal improvements are shown more in detail in Figures 4 and 5, the journal box 7 is shown in part supporting the pressure plate 18 resting upon the journal box at its top and held in vertical travel relation at the bottom by an eye bolt 23 which when placed in the horizontal position and the nut tightened the journal box 7 and pressure plate 18 travel in unison, with the pressure plates being forced against the journal box by two pressure blocks 19 which are rotatably connected to the side walls of the pedestals 15 by means of a shaft 20. The pressure blocks are positioned in between the walls of the pedestals, the shaft ends are securely fastened to the side walls forming the pedestals by means of adjusting bushings 21 and with the cap screw 22, passing through the side walls of the pedestals and one of the holes provided in the bushing and then threaded into the shaft 20, and with the cap screw tightened the shaft is held fast to the two side walls of the pedestals.

The large and rounded end of the pressure block 19 is equipped with two or more small teeth placed in the center and fitted into a gear rack, of the pressure plate 18. Outside, and between the teeth in the pressure block, the end is turned on a radius equal to the distance between the turned surface and center of shaft 20. With this wide and rounded surface on the end of the pressure block, and the adjusting bushing, the horizontal position of the journal box, and the proper clearance between the pressure plate and the end walls of the pedestals are assured at all times.

In removing the journal boxes, wheels and axles with motors, the pedestal supports 26 are removed, the eye bolt nut loosened and the bolt is placed in its vertical position, permitting removal. During said removal the pressure plate 18 is held in place by two coil springs placed in a hole drilled in the end of the pressure block and with the other end fastened to the pressure plate 18, or if preferred one large spring may be placed in between the two pressure blocks, with one end fastened to the center of the pressure plate and the other end fastened to the center member of the pedestal cross supports, there being three or more such supports cast in with the pedestal, permitting free and unrestricted movement of the pressure blocks. Pressure grease caps 25 are provided for grease gun connections; however should the wear of shaft or pressure block, due to lack of lubrication, or otherwise, be sufficient to close the gap between the pressure plate 18 and the pedestal end walls 15 the clearance may be reestablished by removing the cap screw 22 and turning the adjusting bushing 21 so as to force the pressure block 19 toward the journal box 7 thus reestablishing the clearance between the pressure plate and the pedestal end walls, after which the cap screw is to be replaced.

Referring now to the unimproved truck, Figures 1A and 1B, the truck bolster is mounted upon springs separated some twenty or thirty inches, or thereabout, lengthwise with the truck, and fitted in between the cross members of the truck frame, with a clearance permitting free action of the supporting springs and the raising or lowering of the truck ends without disturbing the position of the cab frame.

With a tight fitting king pin and bolster mounted upon the springs, the load is transferred to or from the two axles when operating over uneven track thereby failing to equally distribute the load. Where the motor nose is attached to this type of equalizer, or truck frame with loose fitting king pin and bolster, the motors may be placed in either position as the motor reaction upon the frame and axle transfer the same amount of load, or weight, irrespective of motor position. With the motors positioned as shown, the nose pressure of the front motor is downward, while the nose pressure of the rear motor is upward, tending to rotate the truck frame clockwise, and at the same time the tractive effort of the two motors are forcing the locomotive forward, and the king pin and bolster are forcing the truck frame at its topmost point rearward, its action tends to rotate the truck frame counterclockwise opposing that of the nose action, but to a greater extent, resulting in a reduction in weight upon the front wheels and with the same amount of increase upon the rear ones. As the motor reaction upon the front axle is upward and on the rear axle downward, the total transfer is of some magnitude. With the drawbar placed in line with the top of the truck frame, where contact is made between the frame and the king pin, resisting the tractive effort of the two motors, the equilibrium of the cab is undisturbed, but since it is placed some distance below this point of contact, the rear end of the cab is lifted, reducing the weight upon the rear end truck axles and increasing it upon the two axles of the front truck. This action gives a total reduction in weight upon the front wheeled axles of the rear truck of an amount uncalled for and unnecessary.

During the brake application with this same locomotive, both trucks alike, the resultant vertical action of the four brake hangers create a pressure upon the truck frame tending to rotate it in a clockwise direction and at the same time the horizontal action of the journal boxes forcing the truck frame rearward, while the cab frame is forcing the top of the truck frame forward thus creating an additional clockwise rotation of the truck frame.

As brake hangers, the supporting springs and the axles are all connected with, or to, the equalizing frame of the truck, the supporting springs may be positioned as shown or placed upon the journal boxes without changing this weight transfer.

The drawbar being connected below this point, that is, the top of the truck frame reduces the cab weight upon the front truck and increases it upon the rear one, reducing still further the weight upon the rear wheels of the front truck.

Referring now to the restraining friction between the journal box and the pedestal, which is due to either tractive effort or brake application, requiring undue pressure in a vertical direction, to break this adhesion and overcome the friction during a vertical movement of the journal box, and, or the pedestal.

In the case of a truck with tight fitting king pin and bolster, converting it into a rigid frame locomotive, and without equalizers, where the supporting springs are constantly changing length due to the shifting of the dead weight caused by uneven track, the motor reaction transferring weight from the front axle, either truck, to the rear one and the drawbar transferring weight from the front truck to the rear truck the front wheels, of either truck, encounter a low spot, poorly maintained rail joint, the rear supporting spring becomes compressed while the front one becomes elongated, but not to its loaded length before this action, due to the adhesion between the journal box and the locomotive frame pedestal and this adhesion relieves the axle of a part of the journal box load and this prevents the supporting spring from returning the journal box to its correct position, relative to the pedestal, and due to this adhesion the front wheels take on an additional, momentary, weight reduction.

Referring now to the action of the improved locomotive shown in Figures 2A and 2B with the added equalizer, the truck frame ends are free to pivot vertically unrestricted, where the loose fitting king pin and bolster are employed and to prevent this action the new and added arcuate journal, one for each truck as shown in the drawings and described herein, is being included as a part of the invention.

With this connection all of the vertical forces, while connected directly to the truck frame, react upon the cab frame as though directly connected thereto, transferring their action from the individual truck to the locomotive frame.

The horizontal pressure that formerly acted upon the truck frames, at the top, through the king pin and bolster, is now transferred through the arcuate journal and king pin to the cab frame.

With the draw bar connected to the cab frame at axle height it is in the neutral zone, and without creating any reaction upon the cab frame, in which case the vertical forces alone produce the weight transfer, and as the rearrangement of the motors has placed those on the front of the locomotive to the rear of their respective axles, and those on the rear end to the front of their respective axles, the rear end motors nose action tend to unload the weight upon their equalizers, while the nose action of the front end motors tend to increase the load upon their equalizers. As the axle end of all of the motors are connected to the axles and positioned below the equalizers, or the equalizing system, there is no distribution of weight between the axles due to this axle and motor action, however, as the motor nose, all motors, are connected to the cab frame and above the equalizing system their resultant action is divided, first, between the two trucks and that depending upon the point of contact with the cab frame, and then between the axles of the individual truck through the added equalizers resulting in a slight reduction in weight of the front end wheels upon the rails and a corresponding increase of the rear end wheel weight. With the draw bar fixed at axle height there would be no further transfer of weight, but as it is connected above the axles, the horizontal pressure of the four motored axles against the frame in the forward direction and the draw bar pull in the opposite direction, there will be a slight reduction in the cab weight upon the front end equalizers with a corresponding increase upon the rear end equalizers.

The total weight reduction of either of the two front wheeled axles is only approximately twenty five percent of that of the front wheels of the rear truck, of the conventional locomotive shown in Figures 1A and 1B.

While the equalizer in the improved truck is shown as a one piece member, which is desirable in a truck with a short wheel base, however, on account of its increased length when used in a truck with an extra long wheel base it may be found desirable to lessen its load requirement by the introduction of two companion levers, one end of each pivotally connected to the truck frame and the other end about one-fourth the length of each supporting one of the ends of the intermediate lever, the two levers at a selected intermediate point, supported by the supporting springs, the selected point being determined by the required load reduction.

Referring now to the action of the brake hangers upon the combined truck and cab frames shown in Figures 2A and 2B where the arcuate journal connects the three frames, the new and added equalizer distributes the load equally between the wheels of the attached trucks. With this arrangement the vertical action of the brake hangers, being upon the long cab frame, or equivalent thereto, instead of the short truck frame as in the conventional locomotive frame, the weight transfer is reduced to a minimum, and at the same time the horizontal forces acting upon the long cab frame instead of the short truck, increases the transfer a small amount.

In terms more analytical, and in reference to the improved locomotive with the vertical action of the motor's nose and the brake hangers direct upon the cab frame, or the equivalent thereto, and above the equalizer, together with the horizontal action of the draw bar, the weight transfer may be determined by an equation based upon moments of force and taken from the cab center, or the center of gravity. As the axle ends of the motors together with the axles and the wheels are below the equalizers, their forces are not to be included with the forces acting upon the cab frame but are to be dealt with independently and their forces added to or subtracted from the weight change, upon the journal boxes, through the equalizers due to the other forces acting upon the cab frame.

In the case of the conventional locomotive, where the truck frame is supposed to do the equalizing, in calculating the weight transfer the moments are, or may be, taken from the truck frame center as the motor nose and axle action are both upon the equalizer, the change in weight upon the rails may be included in the equation.

With the improved pedestal, the journal box, or pedestal is free to move in a vertical direction at any time without having to overcome the journal box and pedestal adhesion, as shown with the unimproved pedestal, and therefore remove entirely the momentary weight transfer caused by the conventional pedestal.

Due to this improved pedestal the resilient action of the supporting springs are unrestricted at all times regardless of whether the locomotive is exerting heavy tractive effort or traveling at a high rate of speed, thereby providing protection for the delicate apparatus placed in the locomotive cab, and this applies not only to the four axle locomotive but to locomotives having any number of axles.

The invention in its broader aspects is not limited to the specific mechanism shown and described but departures may be made therefrom within the scope of the invention and without sacrificing its chief advantages.

What is claimed is:

1. In a railway locomotive, the combination of a pair of two axled trucks, a cab structure supporting a draw bar at each of its ends, pivotally mounted upon said trucks, each truck being equipped with axle hung traction motors, those on the front truck being positioned to the rear of their respective axles while those on the rear truck are to the front of their respective axles, the nose of these motors being supported by the truck frame cross members, one end of each truck, through mechanical means, consisting of an arcuate journal, or plate, attached to the under side of the cab frame and arranged to receive between its jaws, the tongue of a bolster attached to either of the end cross members of the truck frame, for maintaining horizontal relation between the truck and cab frames, an equalizing lever positioned in between the two side walls of the truck's two side frames, its intermediate point pivotally connected to the top piece of the truck frame and midway between the two axles, the ends of said levers being supported by springs mounted upon and near the ends of the distributing bars, the distributing bars, having their ends supported by the journal boxes, the journal boxes being secured in and between the truck frame pedestals and arranged for vertical travel.

2. In a railway locomotive, the combination of a pair of two axled trucks, a cab structure supporting a draw bar at each of its ends, pivotally mounted upon said truck, each truck being equipped with axle hung traction motors, those on the front truck being positioned to the rear of their respective axles while those on the rear truck are to the front of their respective axles, the nose of these motors being supported by the truck frame cross members, one end of each truck, through mechanical means, consisting of an arcuate journal, or plate, attached to the underside of the cab frame and arranged to receive between its jaws, the tongue of a bolster attached to either of the end cross members of the truck frame, for maintaining horizontal relation between truck and cab frames, an equalizing lever positioned in between the two side walls of the truck's two side frames, its intermediate point pivotally connected to the top piece of the truck frame and midway between the two axles, the two ends of this lever, or equalizer, are supported by the short ends, about one-fourth the length, of two companion levers, or equalizers, resting upon the supporting springs at their intermediate points and with their other ends pivotally connected to the truck frame top piece and near its ends, the supporting springs mounted upon and near the ends of the distributing bars having their ends supported by the journal boxes, the journal boxes being secured in and between the truck frame pedestals and arranged for vertical travel.

3. In a railway locomotive, the combination of a pair of two axled trucks, a cab structure supporting a draw bar at each of its ends, pivotally mounted upon said trucks, each truck being equipped with axle hung traction motors, those on the front truck being positioned to the rear of their respective axles while those on the rear truck are to the front of their respective axles, the nose of these motors being supported by the truck frame cross members, one end of each truck, through mechanical means, consisting of an arcuate journal, or plate, attached to the under side of the cab frame and arranged to receive between its jaws, the tongue of a bolster attached to either of the end cross members of the truck frame, for maintaining horizontal relation between the truck and cab frames, an equalizing lever positioned in between the two side walls of the truck's two side frames, its intermediate point pivotally connected to the top piece of the truck frame and midway between the two axles, the ends of said levers being supported by springs mounted upon and near the ends of the distributing bars having their ends supported by the journal boxes, a pressure plate, two per journal box, fitted with rack teeth and positioned in between journal boxes and the pedestal end walls, the top of the pressure plate resting upon the journal box and the bottom end attached to the journal box by means of a removable eye bolt, a pressure block, four per journal box, positioned in between the pedestal side walls, one end of the pressure block rounded and fitted with gear teeth, the teeth fitted in the rack of the pressure plate and having the other end rotatably connected to the pedestal by means of a shaft, the shaft fitted with adjustable bushings and held in place by a cap screw, tension springs attached to the pressure plate and pressure block to maintain the proper relation between the pressure block and the pressure plate during journal box removal and replacement.

References Cited in the file of this patent

UNITED STATES PATENTS

| | | |
|---|---|---|
| 149,693 | Thompson | Apr. 14, 1874 |
| 907,822 | Larson | Dec. 29, 1908 |
| 1,584,135 | Pflager | May 11, 1926 |
| 1,895,500 | Todd | Jan. 31, 1933 |
| 1,922,896 | Lipetz | Aug. 15, 1933 |
| 2,126,668 | Ruth | Aug. 9, 1938 |
| 2,385,642 | Peterson | Sept. 25, 1945 |
| 2,678,007 | Keiser | May 11, 1954 |

FOREIGN PATENTS

| | | |
|---|---|---|
| 557,046 | France | Aug. 1, 1923 |
| 261,800 | Great Britain | June 23, 1927 |